(No Model.)

A. REKART.
HARVESTER REEL.

No. 491,264. Patented Feb. 7, 1893.

Witnesses
A. Ruppert.
G. B. Fowler

Inventor
Adam Rekart
Per
Thomas P. Simpson
Attorney

United States Patent Office.

ADAM REKART, OF FORT JENNINGS, OHIO.

HARVESTER-REEL.

SPECIFICATION forming part of Letters Patent No. 491,264, dated February 7, 1893.

Application filed September 19, 1892. Serial No. 446,318. (No model.)

*To all whom it may concern:*

Be it known that I, ADAM REKART, a citizen of the United States of America, residing at Fort Jennings, in the county of Putnam and State of Ohio, have invented certain new and useful Improvements in Harvester-Reels, of which the following is a specification, reference being had therein to the accompanying drawings.

This invention relates to harvester reels and consists in an improved construction for such reels as hereinafter described and claimed.

Figure 1:
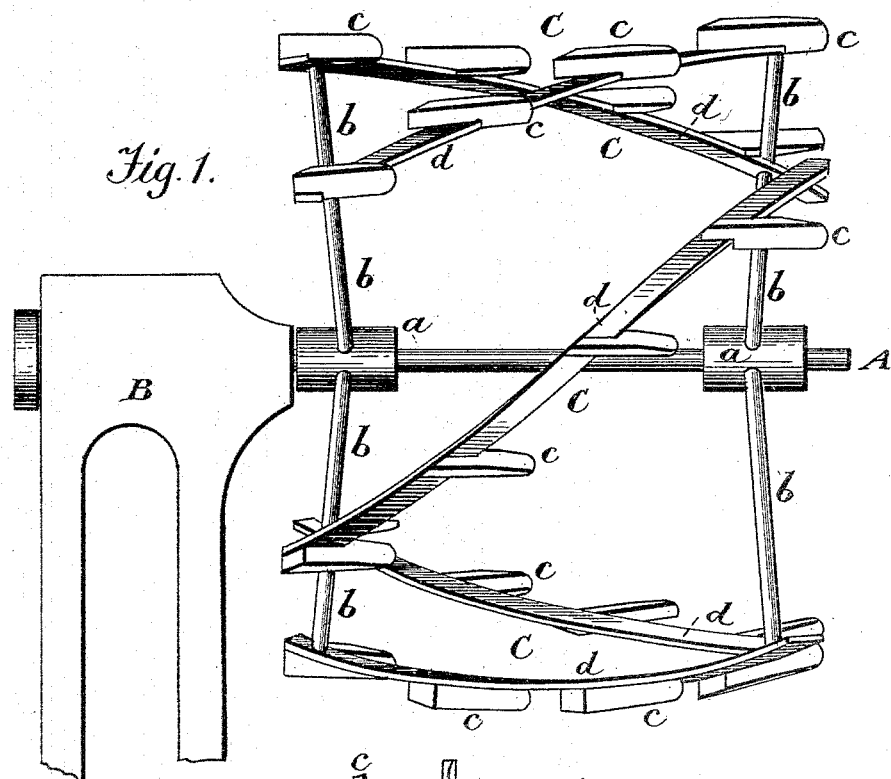
Figure 2:
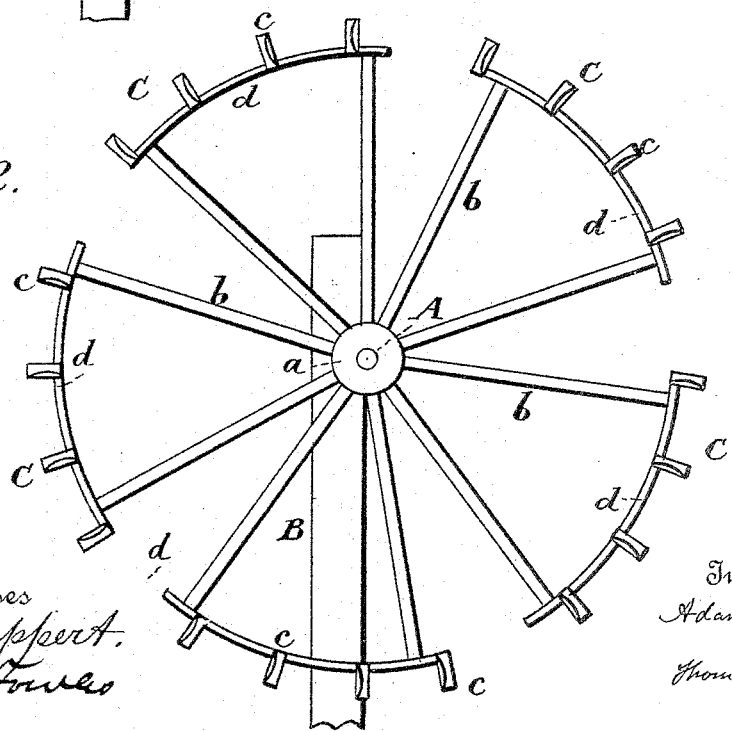

In the accompanying drawings—Figure 1 represents a front view of my improved reel and part of a frame by which it is carried. Fig. 2 is an end view of the reel.

A designates a shaft on which the reel is mounted, said shaft being carried by a frame B. The reel is preferably formed as shown, with the two hubs $a$, the spokes $b$, extending therefrom, and the beaters C, connected with said spokes at their outer extremities.

The beaters C are constructed of the bars $d$ and the short wings or grain catchers $c$ secured to said bars. The bars $d$ are somewhat curved, and each of said bars extends from a spoke $b$ on one end of the reel to a spoke at the opposite end, the bar being in a diagonal position, as the two spokes with which it is connected are not directly opposite each other. Several of the short wings or grain-catchers $c$ are secured laterally at intervals to each bar $d$, the latter being in a diagonal position and the said wings in position parallel or nearly so with the shaft of the reel. By this construction, the grain caught by a beater at one sweep is not struck by the beater at once along the entire length of the beater, but is caught in sections by the wings $c$ successively. This form of beater is found in practice to be preferable and well adapted for harvesting heavy, standing grain, and is of especial utility in picking up grain which does not stand upright. The strain on the bars of the reel is also lessened by this construction.

I claim,

The combination with the shaft of a harvester reel, of the hubs $a$ and spokes $b$, diagonal bars $d$ secured to the extremities of said spokes, and wings $c$, secured to said diagonal bars, at intervals, in position to catch the grain, substantially as set forth and described.

In testimony whereof I have affixed my signature in presence of two witnesses.

ADAM REKART.

Witnesses:
P. KRAMER,
C. VIERE.